Dec. 3, 1935.    J. F. KNAPP    2,022,916
VEHICLE CONSTRUCTION
Filed March 27, 1934    2 Sheets-Sheet 1
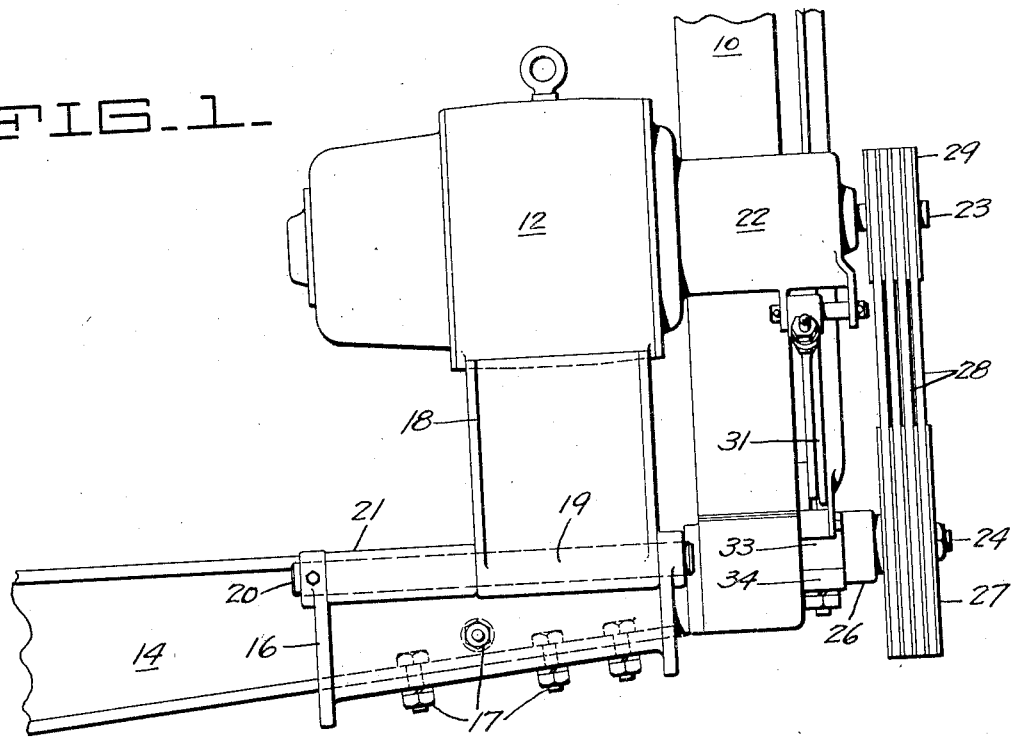
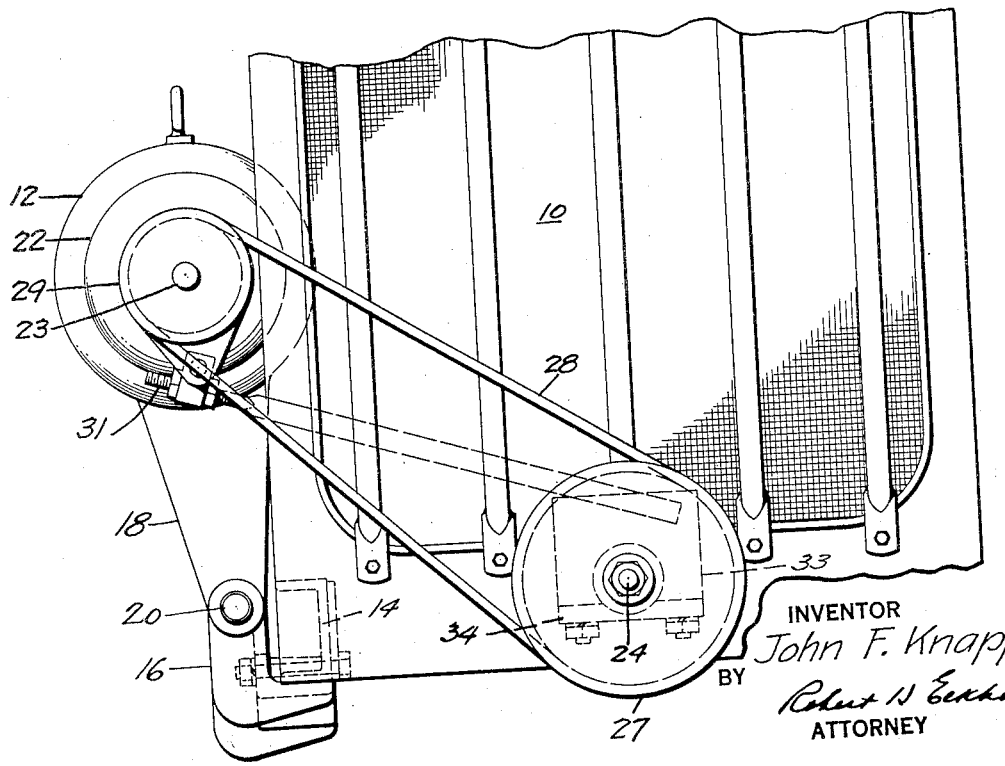
INVENTOR
John F. Knapp
BY Robert N Eckhart
ATTORNEY Dec. 3, 1935.  J. F. KNAPP  2,022,916
VEHICLE CONSTRUCTION
Filed March 27, 1934   2 Sheets-Sheet 2
FIG_3_
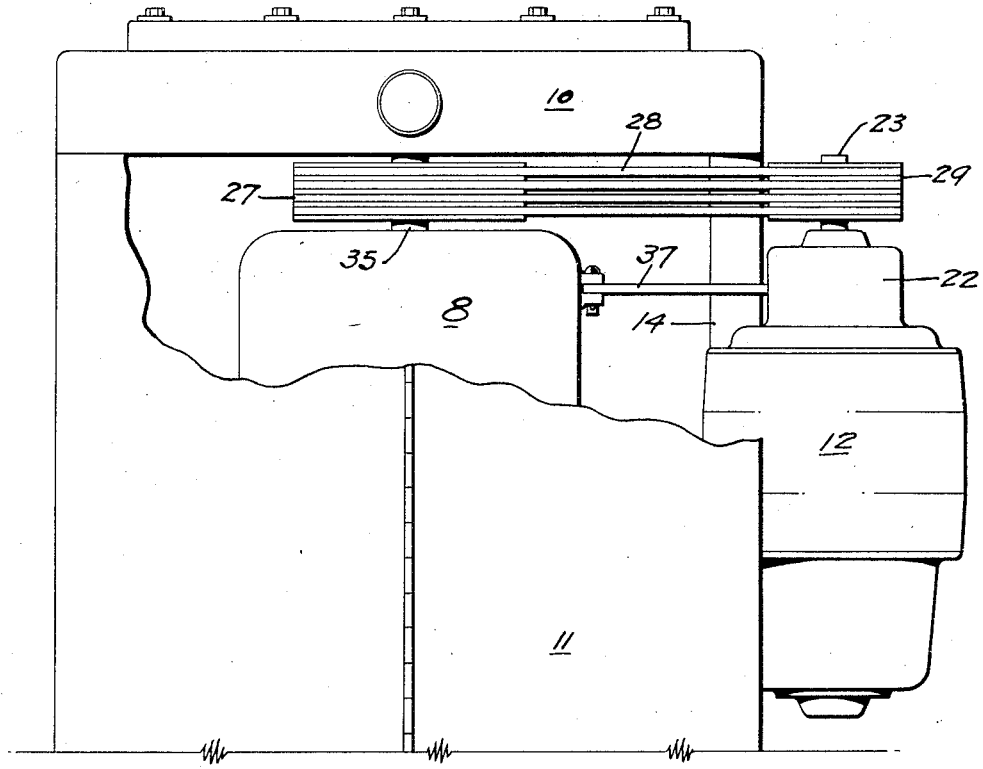
FIG_4_
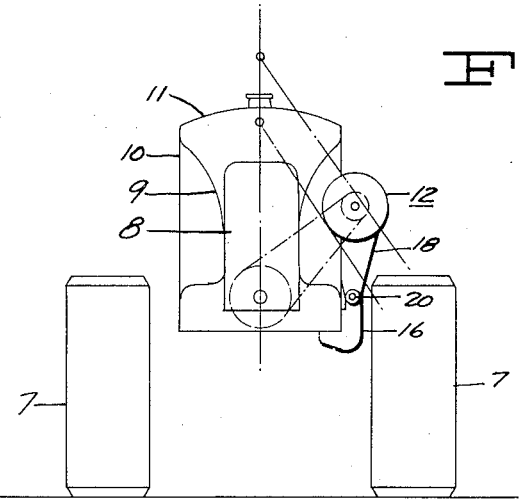
INVENTOR
John F. Knapp
BY
Robert N Eckhoff Jr
ATTORNEY Patented Dec. 3, 1935

2,022,916

UNITED STATES PATENT OFFICE 2,022,916

VEHICLE CONSTRUCTION

John F. Knapp, Oakland, Calif., assignor to American Tractor Equipment Corporation, a corporation of California Application March 27, 1934, Serial No. 717,591

4 Claims. (Cl. 180—54)

This invention relates to a vehicle construction and more particularly to the construction of a track laying type tractor, utilized in construction work wherein the tractor furnishes electric power for the operation of other equipment such as an earth mover as in Figure 4 of the patent to Austin Number 1,928,778; a wagon or welding equipment or hand operated tools. In a prior copending application, Serial Number 538,764, now Patent Number 1,955,925, is shown the mounting of an electric generator for operation by the customary power take-off of the tractor. While this mounting is generally satisfactory, special brackets and equipment are required for each different size and make of tractor, thus making the installation expensive. In addition, the power take-off on almost all tractors operates only when the tractor is moving, being connected through the transmission to the driving sprocket. In accordance with this invention, I provide an electric generator on the tractor in such a manner that it is driven, whether the tractor is moving or is at a standstill, so long as the engine is operating.

Tractors are utilized in earth moving, grading, and excavating operations. These operations must be conducted carefully, not only to observe such limits as grade lines but also because the physical conditions of operation are often precarious and dangerous for the machine and its operator. It is therefore highly desirable that the operator be able to see as much of the area about the tractor as is possible so that the tractor can be efficiently manipulated to secure the best results. To enable such results to be secured, I mount the electric generator on the tractor in a particular manner so that, while an adequate support for the generator is provided, the vision of the operator is not obstructed or hampered.

The invention includes other objects and features of advantage in addition to the foregoing which will appear in the following description of the embodiment of my invention shown in the drawings, in which:

Figure 1 is a side elevation showing the generator mounting in detail.

Figure 2 is a front elevation of the mounting and radiator.

Figure 3 is a plan view of another mounting.

Figure 4 is a view showing the relation of the tractor form of dash, radiator, generator, and tracks. (See Patent 1,970,001 to Eberhard.)

In its preferred form, the vehicle construction of my invention comprises a tractor, usually one having a skeleton or recessed dash. Upon this tractor is mounted a generator, the mounting being such that the view of the operator of the area ahead of the tractor tracks is not obstructed.

In the form shown in Figures 1 to 4 inclusive, there is disclosed a track laying type tractor having the usual tracks 7, an engine 8, and a dash 9 of the skeleton or recessed type, as appears in Figure 4, which, with the radiator 10, supports a hood 11. This dash permits the operator a full and unobstructed view of the area in front of each track.

To prevent obstruction of the operator's view, I preferably mount generator 12 forward on the tractor and as close in to engine 8 and radiator 10 as is practical. The tractor includes two, generally parallel channels 14, between which are mounted the radiator and the engine. The generator is preferably mounted on one of these channels, a bracket 16 being secured by bolts 17 for this purpose. An arm 18 is welded to the generator casing. This arm includes an eye 19 through which pin 20 is passed. The bracket and pin are longer than the arm is wide so that adequate support is provided while the lateral position of the arm on the pin can be varied, means such as spacer 21 being employed to fix the arm in position.

In that form shown in detail in Figures 1 and 2, the generator casing includes an end bell 22 of reduced diameter to permit the generator to lie behind the radiator (Figure 2) while its shaft 23 extends beyond the radiator. In this manner, the heavy and bulky generator can be set back out of the way as well as high enough so as not to obstruct the view, while driven from a shaft 24 extending in front of the radiator.

Shaft 24 is carried in an auxiliary bearing 26 at the radiator base and is suitably connected to the crank shaft of the engine. A multi-groove pulley 27 is secured to the shaft 24 and V-belts 28 are extended about said pulley and pulley 29 on generator shaft 23. The tension on the belts is adjusted by rods 31 which extend from a plate 33 held by plate 34 about bearing 26. Multi-groove pulleys and V-belts are preferred because of slippage taking up a shock load as well as because of the positiveness of drive.

When it is possible to mount pulley 27 on the crank shaft 35, as in Figure 3, the generator can be set in closer to the engine and behind the radiator so that even less of the operator's view is obstructed although in this view I have shown the generator in much the same position as in Figure 2. This is only to show a portion of the engine in the frame, it being possible to position the generator close to the engine with adjusting rod 37.

The connection of the pulley 27 to the pulley 29 can be by means of V-belts which can be joined after passing over the pulleys or a silent chain and suitable sprockets can be used instead.

The dash ordinarily limits the operator's view. To obviate this a dash in the form of an inverted V is utilized, such a dash providing support for the hood and protecting the operator from the heat and fumes of the engine while permitting him a free view of each track and the ground area ahead for manipulation of the tractor and any tool mounted in front of the tractor.

In the several forms disclosed it is to be observed that the view from the operator's station, of which the dash board forms one end, is not obstructed by the generator. This is secured by mounting the generator over one frame channel and in as close as is possible to the engine and in back of the radiator as well as above the track so that, as appears by the dotted sight lines in Figure 4, the view from the operator's station is not obstructed, the operator being enabled by the mounting to have a clear view ahead of the track on the generator side of the tractor.

The hinge mounting of the generator also permits of carrying the generator in close to the engine in use while, when it is necessary to work on the engine or auxiliary units thereon it is possible to swing the generator out of the way. In Figure 4 it will be observed that the generator can be swung from in back of the radiator and against the engine to rest on a track, a feature of advantage.

I claim:

1. In a tractor having spaced frame members, an engine mounted between said frame members, a radiator carried on said frame members, a shaft driven by said engine and extending beyond said radiator, a multi-groove pulley on said shaft, a generator mounted on one of said frame members behind said radiator, said generator having an end bell extending beyond said radiator and supporting a driven shaft extending beyond said radiator, a multi-groove pulley on said driven shaft, and belts running over said pulleys.

2. In a tractor having spaced frame members, an engine mounted between said frame members, a radiator carried on said frame members, a shaft driven by said engine and extending beyond said radiator, a multi-groove pulley on said shaft, a bracket secured to one of said frame members, a generator, support means for said generator including a hinge mounting on said bracket, means for securing said support means against hinge movement with said generator behind said radiator, said generator having an end bell extending beyond said radiator and supporting a driven shaft extending beyond said radiator, and means for rotating said generator shaft from said engine driven shaft.

3. In a tractor having spaced frame members, an engine mounted between said frame members, a radiator carried on said frame members, a shaft driven by said engine and extending beyond said radiator, a pulley on said shaft, a bracket secured to one of said frame members, a generator, support means for said generator including an arm and a pin extending through said arm and said bracket to provide for said generator, a pad on one of said frame members, a hinge mounting on said pad, means for securing said support means against hinge movement with said generator behind said radiator, said generator having an end bell extending beyond said radiator and having a driven shaft extending beyond said radiator, a pulley on said driven shaft, and a belt running over said pulleys.

4. A tractor having a radiator mounted in a main frame, a generator having an end bell and a body portion, a hinge mounting for said generator on a side of said main frame, and means for retaining said generator and said mounting against movement with said end bell lying alongside a side of said radiator and said body portion partially in back of the rear of said radiator.

JOHN F. KNAPP.